United States Patent
Wang

(10) Patent No.: US 10,459,280 B2
(45) Date of Patent: Oct. 29, 2019

(54) LIQUID CRYSTAL DISPLAY PANEL AND MANUFACTURING METHOD THEREOF, LIQUID CRYSTAL DISPLAY

(71) Applicant: Shenzhen China Star Optoelectronics Technology Co., Ltd., Shenzhen, Guangdong (CN)

(72) Inventor: Jinjie Wang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 126 days.

(21) Appl. No.: 15/529,478

(22) PCT Filed: May 10, 2017

(86) PCT No.: PCT/CN2017/083683
§ 371 (c)(1),
(2) Date: May 24, 2017

(87) PCT Pub. No.: WO2018/188140
PCT Pub. Date: Oct. 18, 2018

(65) Prior Publication Data
US 2018/0321550 A1 Nov. 8, 2018

(30) Foreign Application Priority Data
Apr. 13, 2017 (CN) .......................... 2017 1 0241167

(51) Int. Cl.
*G02F 1/1335* (2006.01)
*G02F 1/1339* (2006.01)
(Continued)

(52) U.S. Cl.
CPC .... *G02F 1/133516* (2013.01); *G02F 1/13394* (2013.01); *G02F 1/1341* (2013.01);
(Continued)

(58) Field of Classification Search
CPC ............. G02F 1/133514; G02F 1/1368; G02F 2001/136222; G02F 1/133516;
(Continued)

(56) References Cited

U.S. PATENT DOCUMENTS

2004/0195573 A1* 10/2004 Kim .................. G02F 1/136227
257/72
2011/0069258 A1* 3/2011 Joo ........................ G02B 5/201
349/106

(Continued)

*Primary Examiner* — Jessica M Merlin
(74) *Attorney, Agent, or Firm* — Andrew C. Cheng

(57) ABSTRACT

The disclosure discloses a liquid crystal display panel, a manufacturing method thereof and a liquid crystal display. The liquid crystal display panel includes a top substrate, a bottom substrate, a liquid crystal layer between the top substrate and the bottom substrate, and post spacers supporting the top substrate and the bottom substrate to maintain a cell thickness of the liquid crystal layer. The bottom substrate is further disposed with a color filter layer. The color filter layer includes an R color filter region, a G color filter region and a B color filter region. The G color filter region includes a first sub-region and a second sub-region. The first sub-region is disposed with a G color filter. The second sub-region is disposed with a non-G color filter material. The non-G color filter material is disposed correspondingly to the post spacers.

14 Claims, 4 Drawing Sheets

(51) Int. Cl.
 *G02F 1/1341* (2006.01)
 *G02F 1/1333* (2006.01)
 *G02F 1/1362* (2006.01)

(52) U.S. Cl.
 CPC .......... *G02F 1/133514* (2013.01); *G02F 2001/13396* (2013.01); *G02F 2001/133354* (2013.01); *G02F 2001/136222* (2013.01); *G02F 2201/52* (2013.01)

(58) Field of Classification Search
 CPC ....... G02F 2001/13396; G20F 2201/52; H01L 27/3218
 See application file for complete search history.

(56) References Cited

U.S. PATENT DOCUMENTS

2012/0314163 A1* 12/2012 Joo ................. G02F 1/13394
 349/106
2014/0375936 A1* 12/2014 Park ................ G02F 1/13394
 349/106

\* cited by examiner

LIQUID CRYSTAL DISPLAY PANEL AND MANUFACTURING METHOD THEREOF, LIQUID CRYSTAL DISPLAY

FIELD OF THE DISCLOSURE

The disclosure relates to a display technical field, and more particularly to a liquid crystal display panel, a manufacturing method thereof and a liquid crystal display.

BACKGROUND

TFT-LCD is the acronym of thin film transistor-liquid crystal display. Color filter on array (COA) is the technique that producing a color filter on a TFT substrate.

During the TFT-LCD panel design of the COA technique, as the benzene ring of the G color filter has a branched chain containing bromine (Br) element, the Br ions can easily be separated under high temperature, the Br ions will contaminate the cell.

In the prior art, in order to prevent a post spacer (PS) from bursting the color filter and contaminating the cell to generate cell substances when the cell section has PS substances, PS will merely be placed at positions of red and blue color filters. But the PS ratio is required to be constant, the manner can hardly meet the requirement of the PS ratio in the measuring range of a matrix.

SUMMARY

The disclosure provides a liquid crystal display panel, a manufacturing method thereof and a liquid crystal display, which can ensure the post spacers to be arranged according to a preset ratio, as well as preventing the post spacers from contacting with the G color filter directly, further preventing Br ions separated from the G color filter contaminating the cell, resulting in improving the quality of the display.

The disclosure provides a liquid crystal display panel. The display panel includes a top substrate, a bottom substrate, a liquid crystal layer between the top substrate and the bottom substrate, and post spacers supporting the top substrate and the bottom substrate to maintain a cell thickness of the liquid crystal layer. The bottom substrate is further disposed with a color filter layer. The color filter layer includes an R color filter region, a G color filter region and a B color filter region. The G color filter region includes a first sub-region and a second sub-region. The first sub-region is disposed with a G color filter. The second sub-region is disposed with a non-G color filter material. The non-G color filter material is disposed correspondingly to the post spacers.

The disclosure further provides a manufacturing method of a liquid crystal display panel. The method includes providing a top substrate and a bottom substrate, defining an R color filter region, a G color filter region and a B color filter region on the bottom substrate, defining a first sub-region and a second sub-region in the G color filter region, preparing a G color filter in the first sub-region, preparing a non-G color filter material in the second sub-region, preparing post spacers on the top substrate, aligning the top substrate and the bottom substrate to contact the post spacers with the non-G color filter material instead of the G color filter, filling a liquid crystal layer between the top substrate and the bottom substrate.

The disclosure further provides a liquid crystal display. The liquid crystal display includes the liquid crystal display panel provided above or prepared by the manufacturing method of a liquid crystal display panel provided above.

Distinguishing from the prior art, the disclosure provides the liquid crystal display panel. The display panel includes the top substrate, the bottom substrate, the liquid crystal layer between the top substrate and the bottom substrate, and the post spacers supporting the top substrate and the bottom substrate to maintain a cell thickness of the liquid crystal layer. The bottom substrate is further disposed with the color filter layer. The color filter layer includes the R color filter region, the G color filter region and the B color filter region. The G color filter region includes the first sub-region the second sub-region. The first sub-region is disposed with the G color filter. The second sub-region is disposed with the non-G color filter material. The non-G color filter material is disposed correspondingly to the post spacers. By the manner above, the post spacers can be ensured to be arranged according to the preset ratio, as well as preventing the post spacers from contacting with the G color filter directly, further preventing Br ions separated from the G color filter contaminating the cell, resulting in improving the quality of the display.

DETAILED DESCRIPTION OF PREFERRED EMBODIMENTS

Figure 1:
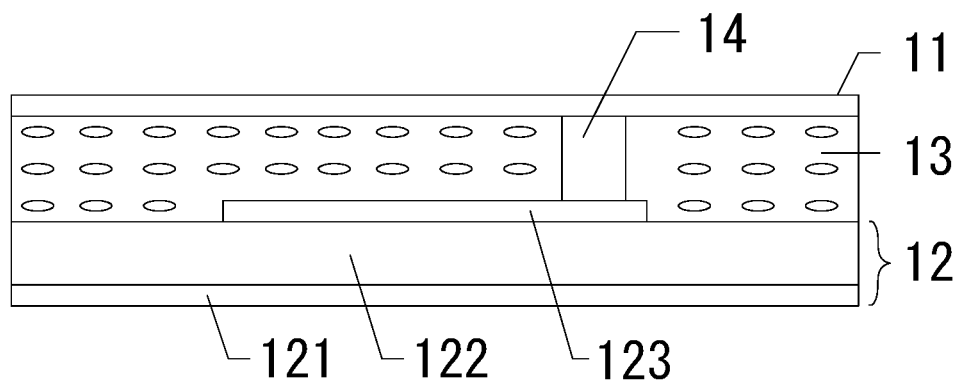
FIG. 1 is a structural schematic view of a liquid crystal display panel according to an embodiment of the disclosure.

Referring to FIG. 1, FIG. 1 is a structural schematic view of a liquid crystal display panel according to an embodiment of the disclosure. In the embodiment, the liquid crystal display panel includes a top substrate 11, a bottom substrate 12, a liquid crystal layer 13 between the top substrate 11 and the bottom substrate 12, and post spacers 14 supporting the top substrate 11 and the bottom substrate 12 to maintain a cell thickness of the liquid crystal layer.

Optionally, the bottom substrate 12 mainly includes a glass substrate 121, a functional layer 122 and a color filter layer 123. The functional layer mainly includes functional devices such as the TFT. The top substrate further includes a common electrode, which will not be repeated. And the color filter layer mainly includes a color filter. A subpixel is corresponding to a color filter of a color. For instance, in an RGB display, the color filter layer includes an R color filter region, a G color filter region and a B color filter region. The color filter in one subpixel can be any one of an R color filter, a G color filter and a B color filter.

Figure 2:
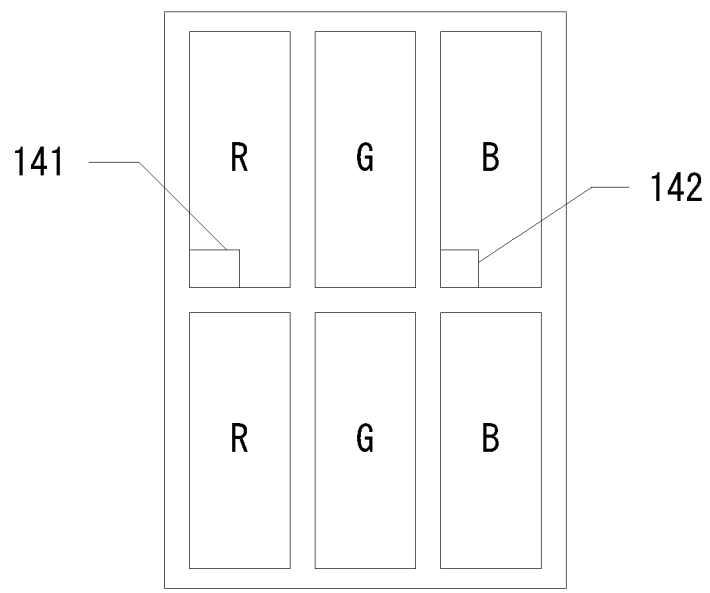
FIG. 2 is a structural schematic view of a color filter and post spacers in the prior art.

In order to illustrate the embodiment of the disclosure clearly, referring to FIG. 2, FIG. 2 is the disposition of a color filter and post spacers in the prior art.

It can be understood that FIG. 2 is a top view. The post spacers will destroy the color filter, moreover, the G color filter will release Br ions in damages to affect the cell. Therefore, only the R color filter will generally be disposed with a first post spacer 141 and only the B color filter will be disposed with a second post spacer 142 in the prior art. It can be understood that the post spacers will be disposed on the R color filters and the B color filters on the entire panel. FIG. 1 is merely an example.

By the method above, the post spacers will not destroy the G color filters. But the irregular arrangement of the post spacers (i.e. the arrangement ratio cannot meet the preset requirement) will affect the display effects.

Figure 3:
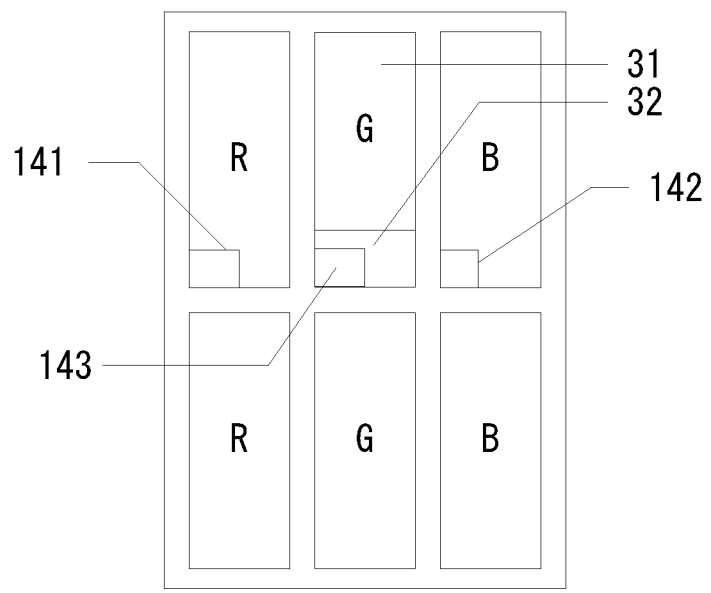
FIG. 3 is a structural schematic view of a color filter and post spacers in a liquid crystal display panel according to an embodiment of the disclosure.

As shown in FIG. 3, in the embodiment, the G color filter region includes a first sub-region 31 a second sub-region 32. The first sub-region is disposed with a G color filter. The second sub-region is disposed with a non-G color filter material. The non-G color filter material is disposed correspondingly to the post spacers. In each pixel, a third post spacer 143 is added besides the first post spacer 141 on the R color filter, the second post spacer 142 on the B color filter. The third post spacer 143 is not disposed on the G color filter, which is disposed on the non-G color filter material of the original G color filter region.

The non-G color filter material and a material of the G color filter are different. Thicknesses of the non-G color filter material and the G color filter are identical.

The G color filter region is a narrow rectangular region. The second sub-region is located at an end of the narrow rectangular region.

By the manner above, the post spacers can be ensured to be arranged according to the preset ratio, as well as preventing the post spacers from contacting with the G color filter directly, further preventing Br ions separated from the G color filter contaminating the cell, resulting in improving the quality of the display.

Optionally, the non-G color filter material is an R color filter or a B color filter.

Figure 4:
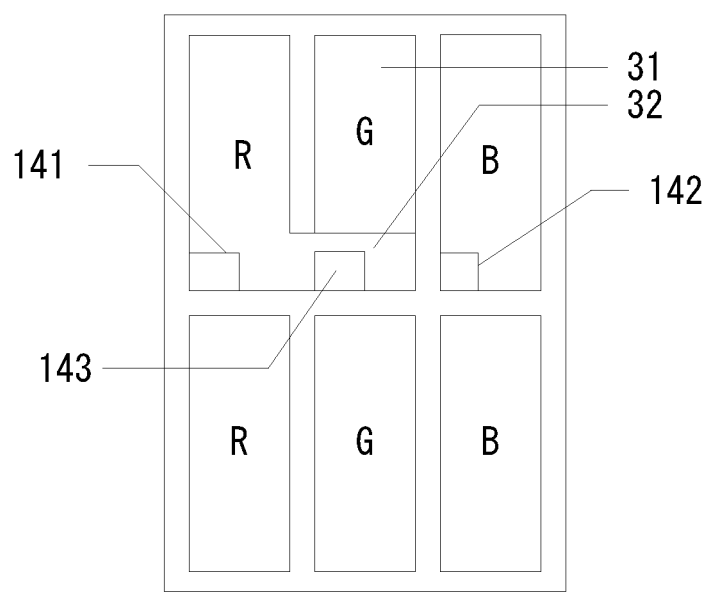
FIG. 4 is a structural schematic view of a color filter and post spacers in a liquid crystal display panel according to another embodiment of the disclosure.

As shown in FIG. 4, in another embodiment, the non-G color filter material is the R color filter. The R color filter of second sub-region is obtained by extending a color filter of the adjacent R color filter region.

Specifically, the R color filter is formed on the second sub-region 32 of the original R color filter region and the G color filter region simultaneously during producing the R color filter.

Figure 5:
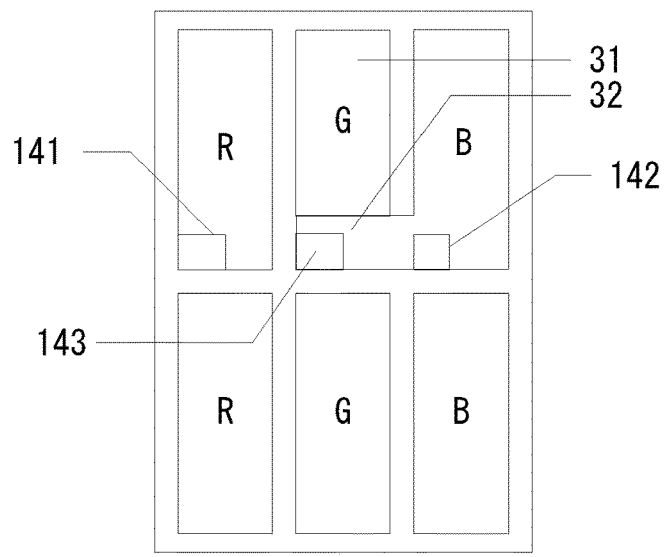
FIG. 5 is a structural schematic view of a color filter and post spacers in a liquid crystal display panel according to still another embodiment of the disclosure.

As shown in FIG. 5, in another embodiment, the non-G color filter material is the B color filter. The B color filter of second sub-region is obtained by extending the color filter of the adjacent B color filter region.

Specifically, the B color filter is formed on the second sub-region 32 of the original B color filter region and the G color filter region simultaneously during producing the B color filter.

Optionally, the post spacers include a main post spacer and secondary post spacers. The adjacent R color filter region, the G color filter region and the B color filter region are respectively corresponding to one main post spacer and two secondary post spacers. A length of the main post spacer is longer than that of the secondary spacers.

For instance, the post spacer on the B color filter is the main post spacer. The post spacers on the R color filter and the B color filter are the secondary post spacers. The top and bottom ends of the main post spacer contact with the top substrate and the bottom substrate respectively. And the top end of the secondary post spacer and the top substrate are separated, which acts as the buffer.

Figure 6:
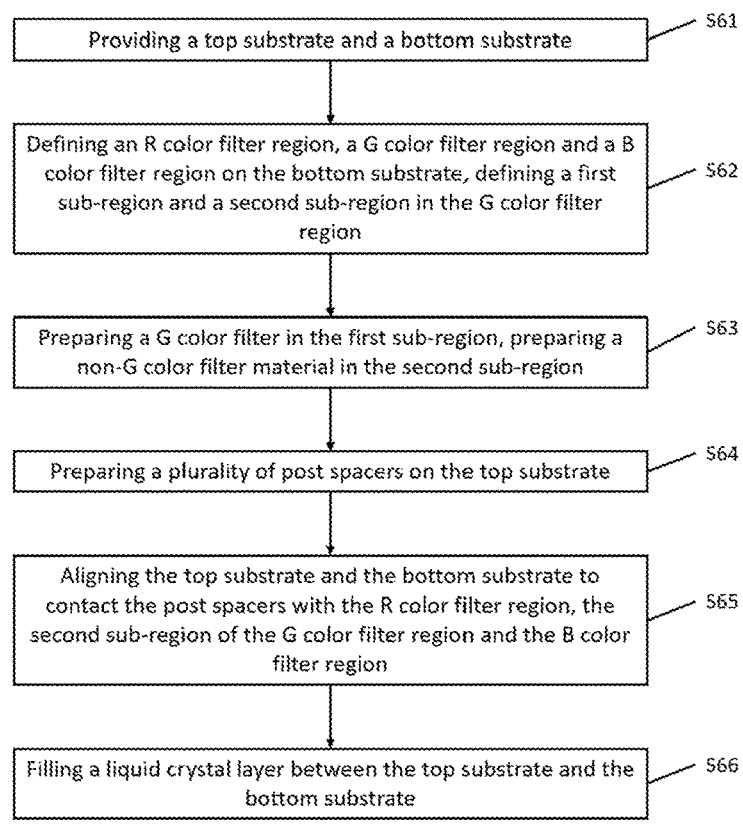
FIG. 6 is flowchart of a manufacturing method of a liquid crystal display panel according to an embodiment of the disclosure.

Referring to FIG. 6, FIG. 6 is flowchart of a manufacturing method of a liquid crystal display panel according to an embodiment of the disclosure. The method includes:

S61, providing a top substrate and a bottom substrate.

S62, defining an R color filter region, a G color filter region and a B color filter region on the bottom substrate, defining a first sub-region and a second sub-region in the G color filter region.

Optionally, a TFT layer can further be included between the bottom substrate and the color filter layer.

S63, preparing a G color filter in the first sub-region, preparing a non-G color filter material in the second sub-region.

Optionally, in another embodiment, S63 can specifically include preparing the G color filter in the first sub-region, preparing an R color filter in the R color filter region and the second sub-region, or preparing the G color filter in the first sub-region, preparing a B color filter in the B color filter region and the second sub-region.

S64, preparing post spacers on the top substrate.

S65, aligning the top substrate and the bottom substrate to contact the post spacers with the non-G color filter material instead of the G color filter.

S66, filling a liquid crystal layer between the top substrate and the bottom substrate.

It can be understood that the embodiment is the manufacturing method configured to produce the liquid crystal display panel in the embodiments above, the principle is similar, which will not be repeated.

Figure 7:
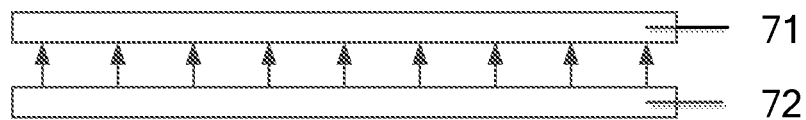
FIG. 7 is a structural schematic view of a liquid crystal display according to an embodiment of the disclosure.

FIG. 7, FIG. 7 is a structural schematic view of a liquid crystal display according to an embodiment of the disclosure, including a liquid crystal display panel 71 and backlight 72.

The liquid crystal display panel 71 is the liquid crystal display panel provided by the embodiments above, or the liquid crystal display panel produced by the manufacturing method provided above, which will not be repeated.

The description above is merely embodiments of the disclosure, which cannot limit the protection scope of the disclosure. Any equivalent structure or process according to contents of the disclosure and the figures, or direct or indirect application in other related fields should be included in the protected scope of the disclosure.

What is claimed is:

1. A liquid crystal display, comprising a liquid crystal display panel and a backlight, the liquid crystal display panel comprising a top substrate, a bottom substrate, a liquid crystal layer between the top substrate and the bottom substrate, and a plurality of post spacers supporting the top substrate and the bottom substrate to maintain a cell thickness of the liquid crystal layer;

the bottom substrate further disposed with a color filter layer, the color filter layer comprising an R color filter region, a G color filter region and a B color filter region, the G color filter region comprising a first sub-region and a second sub-region, the first sub-region disposed with a G color filter, the second sub-region disposed with a non-G color filter material;

the post spacers disposed correspondingly to the R color filter region, the second sub-region of the G color filter region and the B color filter region, wherein each of the post spacers overlap and directly contact with a corresponding R color filter region, second sub-region of G color filter region and B color filter region;

the non-G color filter material and a material of the G color filter being different, thicknesses of the non-G color filter material and the G color filter being identical;

the G color filter region being a narrow rectangular region, the second sub-region located at an end of the narrow rectangular region, wherein an area of the first sub-region is less than that of each of the R color filter region and the B color filter region.

2. The liquid crystal display according to claim 1, wherein the non-G color filter material is an R color filter or a B color filter.

3. The liquid crystal display according to claim 2, wherein the R color filter of the second sub-region is obtained by extending a color filter of the adjacent R color filter region, or the B color filter of the second sub-region is obtained by extending the color filter of the adjacent B color filter region.

4. The liquid crystal display according to claim 1, wherein
the post spacers comprise a main post spacer and secondary post spacers, the adjacent R color filter region, the G color filter region and the B color filter region are respectively corresponding to one main post spacer and two secondary post spacers;
a length of the main post spacer is longer than that of the secondary spacers.

5. The liquid crystal display according to claim 1, wherein a TFT layer is disposed between the bottom substrate and the color filter layer, a common electrode layer is further disposed between the top substrate and the post spacer.

6. A liquid crystal display panel, comprising a liquid crystal display panel and backlight, the liquid crystal display panel comprising a top substrate, a bottom substrate, a liquid crystal layer between the top substrate and the bottom substrate, and a plurality of post spacers supporting the top substrate and the bottom substrate to maintain a cell thickness of the liquid crystal layer;

the bottom substrate further disposed with a color filter layer, the color filter layer comprising an R color filter region, a G color filter region and a B color filter region, the G color filter region comprising a first sub-region and a second sub-region, the first sub-region disposed with a G color filter, the second sub-region disposed with a non-G color filter material, the post spacers disposed correspondingly to the R color filter region, the second sub-region of the G color filter region and the B color filter region, wherein each of the post spacers overlap and directly contact with a corresponding R color filter region, second sub-region of G color filter region and B color filter region; an area of the first sub-region is less than that of each of the R color filter region and the B color filter region.

7. The liquid crystal display panel according to claim 6, wherein the non-G color filter material is an R color filter or a B color filter.

8. The liquid crystal display panel according to claim 7, wherein the R color filter of second sub-region is obtained by extending a color filter of the adjacent R color filter region, or the B color filter of the second sub-region is obtained by extending the color filter of the adjacent B color filter region.

9. The liquid crystal display panel according to claim 6, wherein the non-G color filter material and a material of the G color filter are different, thicknesses of the non-G color filter material and the G color filter are identical.

10. The liquid crystal display panel according to claim 6, wherein the G color filter region is a narrow rectangular region, the second sub-region is located at an end of the narrow rectangular region.

11. The liquid crystal display panel according to claim 6, wherein the post spacers comprise a main post spacer and secondary post spacers, the adjacent R color filter region, the G color filter region and the B color filter region are respectively corresponding to one main post spacer and two secondary post spacers;
a length of the main post spacer is longer than that of the secondary spacers.

12. The liquid crystal display panel according to claim 6, wherein a TFT layer is further disposed between the bottom substrate and the color filter layer, a common electrode layer is further disposed between the top substrate and the post spacers.

13. A manufacturing method of a liquid crystal display panel, comprising:
providing a top substrate and a bottom substrate;
defining an R color filter region, a G color filter region and a B color filter region on the bottom substrate, defining a first sub-region and a second sub-region in the G color filter region;
preparing a G color filter in the first sub-region, preparing a non-G color filter material in the second sub-region, wherein an area of the first sub-region is less than that of each of the R color filter region and the B color filter region;
preparing a plurality of post spacers on the top substrate; wherein the plurality of post spacers are disposed correspondingly to the R color filter region, the second sub-region of the G color filter region and the B color filter region; each of the post spacers overlap and directly contact with a corresponding R color filter region, second sub-region of G color filter region and B color filter region;
aligning the top substrate and the bottom substrate to contact the post spacers with the R color filter region, the second sub-region of the G color filter region and the B color filter region;
filling a liquid crystal layer between the top substrate and the bottom substrate.

14. The manufacturing method according to claim 13, wherein preparing the G color filter in the first sub-region and preparing the non-G color filter material in the second sub-region comprise:
preparing the G color filter in the first sub-region, preparing an R color filter in the R color filter region and the second sub-region; or preparing the G color filter in the first sub-region, preparing a B color filter in the B color filter region and the second sub-region.

* * * * *